3,148,226
REMOVAL OF THIOPHENE FROM BENZENE
Abraham Schneider, Overbrook Hills, and Edward J. Janoski, Philadelphia, Pa., assignors to Sun Oil Company, Philadelphia, Pa., a corporation of New Jersey
No Drawing. Filed Apr. 11, 1960, Ser. No. 21,137
5 Claims. (Cl. 260—674)

This invention relates to the refining of benzene for the purpose of reducing the thiophene content and coincidentally removing olenfiic hydrocarbon impurities.

Benzene is used as feed material in numerous chemical manufacturing processes. In many cases, the benzene must have a high purity to be suitable as the starting material for the chemical operation. A particularly objectionable contaminant is thiophene, which in various catalytic operations tends to poison the catalyst even when the thiophene content is small. In some cases, it is required or considered highly desirable that the thiophene content be less than 1 p.p.m. Another type of benzene-contaminant generally considered as undesirable is olefinic hydrocarbons which, even though present in small amount, will prevent the benzene from passing nitration grade specifications.

A conventional procedure for removing thiophene from benzene and the like involves treatment with strong sulfuric acid. However, this treatment leaves sulfated or sulfonated compounds as well as olefinic polymers in the benzene and hence must be followed by further purifying steps such as water washing, clay treatment and distillation.

The present invention is directed to a simplified process for refining benzene, which process is highly effective for reducing the thiophene content and at the same time removing olefinic hydrocarbons.

According to the invention, benzene containing thiophene is contacted with a liquid aluminum bromide complex composed of aluminum bromide, a methyl benzene having from 1 to 5 methyl groups per molecule and hydrogen bromide. While aluminum bromide itself is highly soluble in benzene, the aluminum bromide complex is substantially immiscible with benzene. Hence, after contacting the benzene with the complex, the two phases can readily be separated from each other by settling. Substantially all of the thiophene is removed in the aluminum bromide complex phase as also are any olefins which may have been present in the benzene feed. By means of this treatment, benzene having a thiophene content less than 1 p.p.m. and meeting nitration grade specifications can readily be produced. The treatment is effective at room temperature, although both lower and higher temperatures can be used with the same effectiveness.

The methyl benzene used is preparing the aluminum bromide complex can be any monocyclic aromatic having at least one and not more than five methyl groups attached to the benzene ring. These include toluene, xylenes, mesitylene, pseudocumene, hemimellitene, tetramethylbenzenes and pentamethylbenzene. It is preferable to use a normally liquid aromatic in preparing the complex, although a normally solid aromatic, such as durene, can be used by carrying out the preparation at a temperature above the melting point of the hydrocarbon.

The complex is prepared by mixing aluminum bromide with the methyl benzene in a reactor and then pressuring in hydrogen bromide while agitating the mixture. The molar proportion of methyl benzene to $AlBr_3$ should be in the range of 0.5:1 to 1:1 and that of HBr to $AlBr_3$ in the range of 0.5:1 to 1:1. More preferably, each of such molar proportions should be about 0.5 to 1. Addition of the hydrogen bromide causes a heat release as the complex forms and the complex first appears as a separate phase. When the complexing reaction is complete, the entire mixture becomes a single phase which is a clear reddish liquid. It is preferable to stir the mixture for at least 20 minutes to insure completion of the reaction.

Treatment of the benzene feed is carried out by intimately contacting it with the liquid complex prepared as described above. This can be done batchwise or continuously utilizing any suitable means of effecting intimate contact. The mixture is then allowed to settle into an upper benzene layer and a lower complex layer and the layers are separated. Essentially complete separation can be obtained in this manner, so that all of the benzene and all of the complex are recovered. The complex can be re-used for treating further quantities of benzene feed. Eventually the thiophene and olefinic reaction products will build up in the complex to such extent as to reduce its effectiveness. In order to maintain the activity of the complex in commercial practice, it is desirable to remove a drag stream of the complex from the system and replace it with a corresponding amount of fresh complex. The treated benzene may contain small amounts of halide extracted from the complex and can be water washed to effect halide removal.

The following example is a specific illustration of the invention:

An aluminum bromide complex was prepared by first mixing 29.4 g. of toluene (0.320 mole) with 60 g. of $AlBr_3$ (0.226 mole) in a closed reactor at room temperature, and then passing HBr into the reactor and stirring the mixture for 30 minutes. Addition of the HBr caused the mixture to warm up as the complex formation occurred. The mixture first took on the appearance of a white emulsion and subsequently became a clear reddish liquid. The reactor was then vented to remove any excess HBr. It was found that 9.1 g. of HBr (0.113 mole) and 20.8 g. of toluene (0.226 mole) had reacted. The resulting complex was then used for treating four successive batches of benzene containing 13.8 p.p.m. of thiophene and a small amount of olefins. For each batch about 173 g. of the benzene was added to the reactor and the mixture was stirred rapidly at ambient temperature for a time which varied from batch to batch. An atmosphere of dry nitrogen was maintained in the reactor during the treatment. After the reaction period the batch was allowed to settle and the benzene layer was recovered and tested for thiophene content. Results were as follows:

|  | Reaction Period, Min. | Thiophene Content, p.p.m. |
|---|---|---|
| 1st Batch | 25 | 0.2 |
| 2nd Batch | 90 | 0.1 |
| 3rd Batch | 150 | 0.3 |
| 4th Batch | 10 | 0.7 |

These results show that throughout the four successive treatments the complex remained highly effective for removing thiophene. The purified benzene also was nitration grade.

We claim:

1. Method of removing thiophene from benzene which comprises contacting thiophene-containing benzene with a liquid aluminum bromide complex consisting essentially of aluminum bromide, a methyl benzene having from 1 to 5 methyl groups per molecule and hydrogen bromide, and separating the complex phase from the treated benzene.

2. Method according to claim 1 wherein the molar proportion of said methyl benzene to $AlBr_3$ in the complex is in the range of 0.5:1 to 1:1 and the molar proportion of HBr to $AlBr_3$ is in the range of 0.5:1 to 1:1.

3. Method according to claim 2 wherein each of said molar proportions is about 0.5:1.

4. Method according to claim 1 wherein the benzene feed also contains a small amount of olefinic hydrocarbon and the treated benzene is a nitration grade product.

5. Method according to claim 1 wherein said methyl benzene is toluene.

References Cited in the file of this patent

UNITED STATES PATENTS

| | | |
|---|---|---|
| 2,458,777 | Hepp et al. | Jan. 11, 1949 |
| 2,739,925 | Arnold et al. | Mar. 7, 1956 |
| 2,872,413 | Elliott et al. | Feb. 3, 1959 |

FOREIGN PATENTS

| | | |
|---|---|---|
| 732,170 | Great Britain | June 22, 1955 |